US006696302B1

(12) United States Patent
Franzen

(10) Patent No.: US 6,696,302 B1
(45) Date of Patent: Feb. 24, 2004

(54) CONTAMINATION-FREE TRANSFER OF BIOLOGICAL SPECIMENS

(75) Inventor: Jochen Franzen, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 175 days.

(21) Appl. No.: 09/711,023

(22) Filed: Nov. 9, 2000

(30) Foreign Application Priority Data

Nov. 9, 1999 (DE) ........................................ 199 53 816

(51) Int. Cl.$^{7}$ ............................ G01N 1/10; B01L 3/00; B01L 3/02; B01L 9/00

(52) U.S. Cl. ......................... 436/180; 422/99; 422/102; 422/104; 422/100

(58) Field of Search ............................. 435/393, 286.6, 435/288.5, 305.3, 305.4, 309.2, 286.4; 436/809, 180; 422/9–11, 99, 100, 104; 211/126.5, 74

(56) References Cited

U.S. PATENT DOCUMENTS 2,431,490 A * 11/1947 Lauer ......................... 206/539
2,582,352 A * 1/1952 O'Shaughnessy ........... 194/281
3,488,052 A * 1/1970 Weisbecker ............. 273/153 R
3,501,151 A * 3/1970 Ketchum .................... 273/139
3,510,964 A * 5/1970 Dahners et al. ............... 434/98
3,589,231 A * 6/1971 Postel ......................... 84/102
3,601,403 A * 8/1971 Weisbecker ................. 273/287
3,611,602 A * 10/1971 Gandelman et al. .......... 40/107
3,650,306 A * 3/1972 Lancaster ................... 141/238
3,709,497 A * 1/1973 Barlow .................... 273/282.1
3,756,387 A * 9/1973 Chaney ......................... 206/3
3,961,794 A * 6/1976 Goldfarb et al. ............ 273/273
4,004,548 A * 1/1977 Smola et al. ................. 118/58
4,057,145 A * 11/1977 Wray et al. ................. 206/538
4,067,576 A * 1/1978 Balas et al. .............. 273/282.1
4,082,268 A * 4/1978 Breslow et al. ............. 273/113
4,351,800 A * 9/1982 Kopp et al. .................... 422/70
4,495,150 A * 1/1985 Cook et al. ............. 134/115 R
4,548,245 A * 10/1985 Crandell et al. ............ 141/237
4,582,326 A * 4/1986 Alsip ......................... 273/271
4,673,651 A * 6/1987 Rothenberg et al. ....... 220/23.8
4,786,601 A * 11/1988 Rothenberg ................. 422/942
4,919,894 A * 4/1990 Daniel ........................ 422/104
4,979,748 A * 12/1990 Danielak et al. ............ 273/241
5,096,198 A * 3/1992 Cook ..................... 273/153 R (List continued on next page.)

FOREIGN PATENT DOCUMENTS

DE 297 19 919 U1 5/1999
GB 2023103 A * 12/1979 ........... B65D/25/10

OTHER PUBLICATIONS

Derwent Abstract for "Reactor unit for use in automated combinatorial chemistry." Derwent–Acc–No 1999–216243.*

*Primary Examiner*—Arlen Soderquist
*Assistant Examiner*—Elizabeth Quan

(57) ABSTRACT

The invention relates to devices and methods for the contamination-free transfer of biological specimens, for example from supply containers, into the microtiter plates or comparable processing devices used to process the specimens. Such contamination-free transfer systems for DNA samples are known for microtiter plates with 96 cavities; they are based on covers for the cavities which can be removed by pipetting robots.

The invention consists in covering the processing volumes of the microtiter plates together by a slidable blind which has one or more openings that can be slid over the processing volumes and through which the specimens can be pipetted. The space under the foil is swept by clean gas which emerges from the openings in order to prevent contamination by aerosols.

6 Claims, 1 Drawing Sheet

U.S. PATENT DOCUMENTS

| | | | | | |
|---|---|---|---|---|---|
| 5,190,666 | A | * | 3/1993 | Bisconte | 210/143 |
| 5,217,694 | A | * | 6/1993 | Gibler et al. | 211/74 |
| 5,234,665 | A | * | 8/1993 | Ohta et al. | 356/244 |
| 5,716,584 | A | * | 2/1998 | Baker et al. | 422/131 |
| 5,882,603 | A | * | 3/1999 | Taggart | 206/443 |
| 5,904,899 | A | * | 5/1999 | Hayashi | 422/102 |
| 5,985,675 | A | * | 11/1999 | Charm et al. | 422/104 |
| 6,040,153 | A | * | 3/2000 | Lemonnier | 435/288.3 |
| 6,140,136 | A | * | 10/2000 | Lee | 422/104 |
| 6,156,575 | A | * | 12/2000 | Fassbind et al. | 436/50 |
| 6,245,297 | B1 | * | 6/2001 | Kowallis | 422/100 |
| 6,251,686 | B1 | * | 6/2001 | Studer et al. | 211/74 |
| 6,355,487 | B2 | * | 3/2002 | Kowallis | 422/100 |
| 6,428,003 | B1 | * | 8/2002 | Fondin et al. | 451/173 |
| 6,458,582 | B1 | * | 10/2002 | Kimura et al. | 435/286.2 |

* cited by examiner

CONTAMINATION-FREE TRANSFER OF BIOLOGICAL SPECIMENS

FIELD OF THE INVENTION

The invention relates to devices and methods for the contamination-free transfer of biological specimens, for example from supply containers, into the microtiter plates or comparable processing devices used to process the specimens. Such contamination-free transfer systems for DNA samples are known for microtiter plates with 96 cavities; they are based on covers for the cavities which can be removed by pipetting robots.

BACKGROUND OF THE INVENTION

It is known that laboratories replicating DNA samples by PCR are frequently contaminated by DNA, often during a transfer of DNA samples from the supply containers to the cavities of th e microliter plates in which PCR amplification is to take place. The transfer is particularly critical for non-amplified DNA samples before their PCR replication because very small impurities with only few DNA molecules are also amplified, but other types of biological specimens can also be damaged by contamination, for instance by digesting enzymes.

This problem can be remedied by a system which provides all the cavities of the microtiter plates with covers individually, which can be removed by a pipetting robot. The pipetting robot proceeds as follows: The pipetting head first picks up a new pipette tip from a supply, opens a supply container, removes sample fluid with the pipetting tip, removes the lid from a cavity of the microtiter plate, pipettes the fluid into the cavity, closes the cavity again with the cover, and discards the pipette tip. This process is repeated for all the supply containers.

The considerable success of this system indicates that the contaminations are transferred by aerosols in the air of the laboratory and that a brief opening of the cavities and quickly feeding the specimen in the pipette tip through the air does rarely lead to contamination.

However, this cover system is very slow and is so far only available for microtiter plates with 96 cavities. In the meantime biological specimens are processed in microtiter plates with 384, 1536 or even 3456 cavities. Systems are also used which do away with cavities in the microtiter plates and perform the processing of the specimens in vertical droplets on hydrophilic anchors in a hydrophobic environment. For these systems with a high processing density, contamination-free transfer of the specimens is not yet possible.

OBJECTIVE OF THE INVENTION

It is the objective of the invention to find devices and methods with which solutions with biomolecules can be transferred, for example from supply vessels to processing systems with a high processing density, for instance microtiter plates with a large number of cavities, without contaminating the specimens with airborne impurities from the laboratory.

SUMMARY OF THE INVENTION

The invention is directed to protecting the fluids in the processing volumes from being contaminated by the ambient laboratory air by covering them with a framed, slidable blind which has openings through which the specimens can be pipetted, and by feeding a contamination-free gas into the space under the blind. By sliding the blind the openings can be moved over any processing location. Contamination of the processing volumes under the pipetting openings is avoided by the contamination-free gas which is freely flowing out of the pipetting openings. The gas prevents access from contaminating aerosols. The gas can, for instance, be moistened to prevent the specimens from drying out. Dry gas can be used to deliberately dry the specimens.

A simple embodiment is a blind with one row of openings which can be moved over all row of processing volumes. Microtiter plates show $n^2 \times 96$ processing volumes, n being an integer number, in a pattern of 8×n lines and 12×n rows. A microtiter plate with 1536 wells thus shows the wells in 32 rows at 48 lines each. A blind with 32 openings with diameters of 1.5 millimeter each will easily allow to use pipette heads with four pipettes (18 millimeter distances), 8 pipettes (9 millimeter distances), or 16 Pipettes (4.5 millimeter distances).

Another embodiment is the use of two blinds, on top of each other, both slidable independently. The openings can, for example, be arranged in the form of two rows in right angles in the two blinds, whereby the blinds can be slid at right angles to the two rows.

For the blinds it is possible, for example, to use simple foils which are guided laterally along slide grooves. The blinds can take the form of continuous strips but they can also be wound up on blind rolls. The movement can be created by motors and controlled digitally. Lateral rows of serrations (as with compact camera films) can guarantee precise positioning.

PARTICULARLY FAVORABLE EMBODIMENTS

Figure 1:
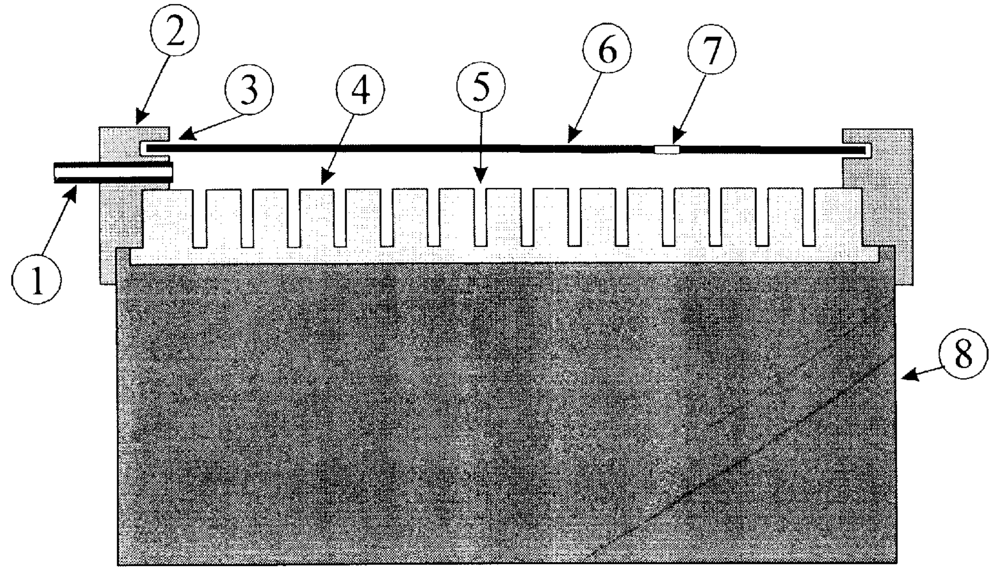
FIG. 1 shows the principle of the invention as a cross section.

FIG. 1 shows the principle of the invention as a first cross section. The microtiter plate (4) with a large number of adjacent processing volumes (5) is placed on the holder (8) and covered with the cover frame (2). In sliding grooves (3) on the cover frame (2) the blind (6) can be moved. Through the openings (7) of the blind (only one opening is illustrated for reasons of greater clarity), material can be pipetted into the processing volumes (5). A gas feeder (1) permits the supply of gas into the space between the microtiter plate (4) and the blind (6); due to the gas thus emerging from the openings (7) the ingress of contaminating aerosol to the processing volumes (5) is prevented.

Figure 2:
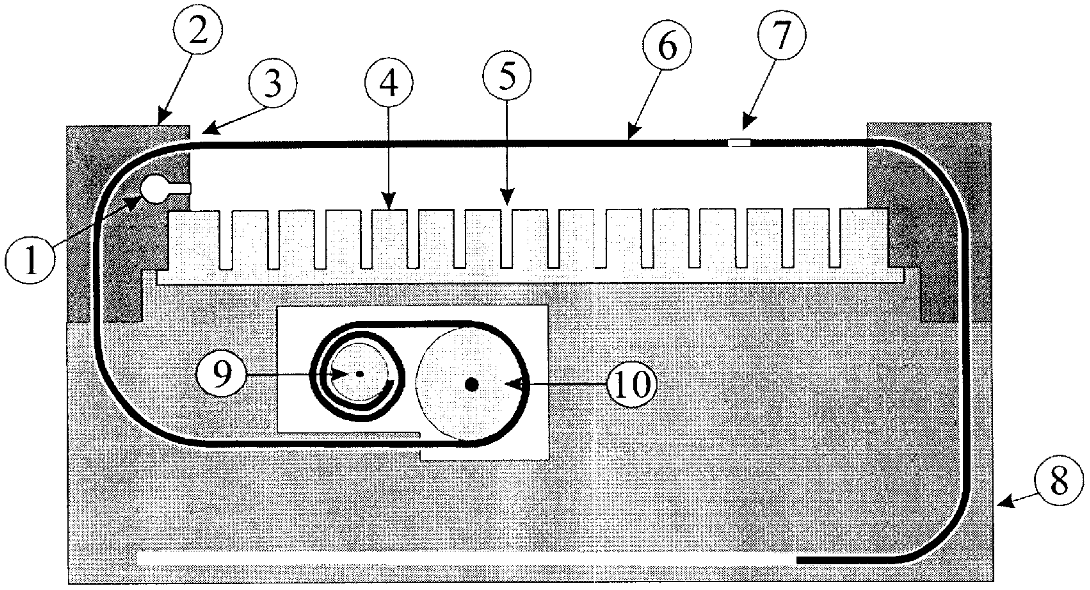
FIG. 2 shows a longitudinal section through the holder and cover frame of the invention.

A favorable embodiment for loading microliter plates is shown as a schematic in FIG. 2, which is a cross section showing the interior of holder (8). A long blind (6) can be removed from a self-tensioning reel (9) by a motorized guide roller (10) and slid through a guide with a groove (3) so that it extends over the microtiter plate. Through the openings (7), which occupy an entire transverse row, the individual processing volumes (5) can be filled with specimen solutions by pipetting. The gas supply (1) feeds superfine-filtered, non-contaminated air which then emerges from the openings (7) and thus prevents any contamination by aerosols from outside. The drive roller (10) can be provided with teeth which intermesh with serrations in the blind.

The blind can preferably be a PTFE foil with a thickness of approx. 0.2 to 0.6 millimeters. This foil has excellent sliding properties, is sufficiently rigid, and highly resistant to soiling. The pipetting openings can be arranged in one row or in two rows.

Loading the processing volumes can be conducted with single pipettes, but also with pipette heads which hold four to sixteen pipettes. There are pipette heads commercially available where the pipette spacing can be changed under motorized control so that the pipettes can be adjusted to the spaces between the supply containers for the samples on their pallets, on the one hand, and the spaces between the processing volumes, on the other.

The solutions with the biological specimens can be filled into the vessel spaces of a microtiter plate (cavities) for processing, but they can also be applied as droplets to hydrophilic anchors in a hydrophobic environment. Processing in droplets permits the use of very small quantities of chemicals and is particularly economical.

To ensure that the droplets do not dry out during a lengthy filling time, the supplied gas can be saturated with the solvent (usually water). However, it may be desirable for the droplets to dry out or thicken; in this case the supplied gas can be dried by appropriate filters or also by warming up. Filling is then best performed close to the supplies of gas, working from there toward the distant end of the processing plate.

The sliding blind has distinct advantages over a fixed cover with as many pipetting holes as processing volumes. The greatly reduced number of pipetting openings in a slidable cover on one hand helps to save contamination-free gas, on the other hand the gas stream can be directed in a wanted manner. Even if a blind with a whole row of pipetting openings is used, the number of pipetting openings is less than 15 percent of the number of processing volumes. If a blind with one row of pipetting openings is used, filling of the processing volumes may begin at the end where the gas is introduced, or at the other end. In one case, the already filled volumes are continuously exposed to the gas flow, in the other case they are protected from the gas.

The frame and processing plate can be simply removed by lifting away when the blind is completely retracted into the holder. It is advisable to completely seal the processing plate with a lid immediately.

It is also possible to connect the holder and cover frame to an external hinge where the blind is fed in. Then the cover frame can be opened for removing the processing plate without completely retracting the blind.

Finally it is also possible to entirely accommodate the reel and drive roller in the cover frame. Then the cover frame can be simply removed at any time. For example, reel rollers can be used at both ends of the blind.

The blind can also take the form of a continuous belt. The groove in the cover frame must then be open at the top and it must be possible to relieve the tension in the continuous belt in order to withdraw the processing plate, possibly with cover frame, laterally.

A special embodiment of the invention comprises two blinds which slide on top of one another and which can be slid toward each other by two motorized controls. This embodiment makes it possible to arbitrarily open the openings and close them again by means of special patterns of the openings in the two blinds. A pattern could, for example, be two slits at 45 degrees relative to the direction of the blind and at 90 degrees to one another, over the entire width of the processing volumes. This arrangement makes it possible to open an opening precisely over each processing volume. However, many other patterns can be specified, including ones which allow easier opening and closing.

The methods and equipment given here are only examples for the use of the basic idea of the invention. Any expert working in biochemistry can easily use the instructions given here to develop further applications or embodiments to suit his particular purposes.

What is claimed is:

1. Method for the contamination-free transfer of biological specimens dissolved in liquid to a processing plate for processing a large number of biological specimens in mutually adjacent processing volumes, comprising the following steps:

(1) covering the processing plate with a frame having a slidable blind, the blind having one or more pipefting openings which can be shifted over the processing volumes by sliding the blind, (2) feeding a contamination-free gas into the space between the processing plate and the blind, (3) moving the openings, by sliding the blind, over the processing volumes to be loaded, (4) pipetting the biological specimen solutions into the processing volumes through the pipetting openings in the blind, and (5) repeating steps 3 and 4 to load the remaining processing volumes.

2. Method according to claim 1 wherein the processing plate has the size of a microtiter plate with $n^2 \times 96$ processing volumes, n being an integer number, in a pattern of 8×n processing volumes per row in 12×n rows.

3. Method according to claim 1 wherein the blind has a row with 8×n pipetting openings, one for each processing volume in a row of processing volumes on said particular processing plate.

4. Cover frame apparatus for use with processing plates with having a large number of mutually adjacent processing volumes within which specimens dissolved in liquid may be located, the apparatus comprising:

a frame having a slidable blind within which a processing plate may be located, the blind having at least one pipetting opening that can be shifted over respective processing volumes of the processing plate by sliding the blind over the processing plate, wherein sliding of the blind allows a pipetting opening of the at least one pipetting opening to be aligned with a processing volume while other processing volumes are covered by the blind; and a gas supply that feeds a supply of contamination free gas into the space between the processing plate and the blind which subsequently emerges through the at least one pipetting opening.

5. Cover frame according to claim 4, wherein the frame is configured to receive a particular processing plate that has the size of a microtiter plate with $n^2 \times 96$ processing volumes, n being an integer number, in a pattern of 8×n processing volumes per row in 12×n rows.

6. Cover frame according to claim 5, wherein the blind has a row with 8×n pipetting openings, one for each processing volume in a row of processing volumes on said particular processing plate.

* * * * *